US009001173B2

(12) United States Patent
Lazzari et al.

(10) Patent No.: US 9,001,173 B2
(45) Date of Patent: Apr. 7, 2015

(54) METHOD FOR PRODUCING A COLOUR LASER IMAGE THAT CAN BE OBSERVED IN THREE DIMENSIONS AND DOCUMENT ON WHICH A COLOUR LASER IMAGE THAT CAN BE OBSERVED IN THREE DIMENSIONS IS PRODUCED

(76) Inventors: Jean-Pierre Lazzari, Sainte-Maxime (FR); Jean-Marc Lazzari, Saint Rémy l'Honoré (FR)

( * ) Notice: Subject to any disclaimer, the term of this patent is extended or adjusted under 35 U.S.C. 154(b) by 0 days.

(21) Appl. No.: 14/002,564

(22) PCT Filed: Feb. 16, 2012

(86) PCT No.: PCT/FR2012/000060
§ 371 (c)(1),
(2), (4) Date: Oct. 8, 2013

(87) PCT Pub. No.: WO2012/117169
PCT Pub. Date: Sep. 7, 2012

(65) Prior Publication Data

US 2014/0028775 A1 Jan. 30, 2014

(30) Foreign Application Priority Data

Mar. 1, 2011 (FR) ..................................... 11 00606

(51) Int. Cl.
*B41J 2/435* (2006.01)
*G02B 27/22* (2006.01)
(Continued)

(52) U.S. Cl.
CPC ................ *B41M 3/14* (2013.01); *B41M 3/148* (2013.01); *B41M 5/267* (2013.01); *B41M 5/34* (2013.01);
(Continued)

(58) Field of Classification Search
CPC ...... B42D 15/00; B42D 15/10; B42D 15/105; B42D 2031/22; B42D 2033/24; B42D 2033/26; B42D 2035/24; B41M 3/14; B41M 3/148; B41M 5/26; B41J 3/407
USPC .................... 347/224, 225, 232; 40/453, 454; 359/454, 455, 463, 619–624
See application file for complete search history.

(56) References Cited

U.S. PATENT DOCUMENTS

| | | | | |
|---|---|---|---|---|
| 4,765,656 | A | 8/1988 | Becker et al. | |
| 5,543,381 | A * | 8/1996 | Kishimoto et al. | 503/201 |
| 8,006,908 | B2 * | 8/2011 | Bergmann et al. | 235/487 |
| 8,314,828 | B2 * | 11/2012 | Bombay et al. | 347/262 |
| 2009/0214105 | A1 * | 8/2009 | van den Berg | 382/154 |

FOREIGN PATENT DOCUMENTS

| | | |
|---|---|---|
| DE | 43 39 216 | 4/1994 |
| WO | 2005/058610 | 6/2005 |
| WO | 2006/110038 | 10/2006 |

OTHER PUBLICATIONS

International Search Report and Written Opinion dated Jun. 1, 2012 for International Application No. PCT/FR2012/000060 filed Feb. 16, 2012, pp. 1-11.

* cited by examiner

*Primary Examiner* — Hai C Pham
(74) *Attorney, Agent, or Firm* — MH2 Technology Law Group, LLP

(57) ABSTRACT

Disclosed are examples of methods and documents of a color laser image observable in three dimensions, which comprises a laserable protective sheet, an array of lenses, colored sub-pixels in column form, wherein a laser beam causes the grey levels to appear in two color laser images observable in three dimensions via stereoscopic effect, and a substrate. The whole, in various implementations, may be laminated. The axes of the columns of sub-pixels and of the lenses may be perpendicular. The laser beam may scan the sub-pixels along the axis of the lenses, in various embodiments.

6 Claims, 3 Drawing Sheets

(51) Int. Cl.

*B41M 3/14* (2006.01)
*B41M 5/26* (2006.01)
*B41M 5/34* (2006.01)
*B42D 15/00* (2006.01)
*B42D 25/41* (2014.01)
*B42D 25/00* (2014.01)
*B44F 7/00* (2006.01)

(52) U.S. Cl.

CPC ......... *B42D 2035/06* (2013.01); *B42D 2035/20* (2013.01); *B44F 7/00* (2013.01); *B42D 15/00* (2013.01); *B42D 25/41* (2014.10); *B42D 25/00* (2014.10)

METHOD FOR PRODUCING A COLOUR LASER IMAGE THAT CAN BE OBSERVED IN THREE DIMENSIONS AND DOCUMENT ON WHICH A COLOUR LASER IMAGE THAT CAN BE OBSERVED IN THREE DIMENSIONS IS PRODUCED

CROSS-REFERENCE TO RELATED APPLICATIONS

This application is a U.S. National Stage application of PCT/FR2012/000060 filed Feb. 16, 2012, which claims priority to French Application No. 11/00606 filed Mar. 1, 2011, the entire disclosures of which are hereby incorporated by reference in their entireties.

FIELD OF APPLICATION, OF THE INVENTION

The present invention concerns the forming of a colour laser image that can be seen in three dimensions. It finds application in particular in identity images dedicated to official documents: identity cards, credit cards, national health insurance cards, passports, driving licenses, secure entry badges, etc.

STATE OF THE PRIOR ART

Modern identity cards are composed of a plastic substrate comprising various decorative, identification or anti-counterfeit designs covered with a transparent protective sheet. The transparent protective sheet is hot welded under strong pressure onto the plastic substrate of the document. This operation is known as <<lamination>> in the trade.

In addition to the designs printed on the substrate, identity documents must carry the identity photo of the owner. This identity photo is produced by a laser beam which, by passing through the transparent protective sheet called <<laserable>> in the remainder hereof, generates grey levels via carbonization in this protective sheet. A secure black and white image is thus obtained. It cannot be replaced by an image printed by inkjet for example without destroying the identity document.

To raise the security level further, it has been proposed, to produce these black and white laser images having a three-dimensional appearance. U.S. Pat. No. 4,765,656 describes a data substrate coated with cylindrical lenses through which a laser beam via carbonization engraves two black and white images differing through the tilt angle of the laser beam. The reverse pathway of the light enables the observer to see one or other of the images depending on the tilt angle of the substrate.

Patent WO2006110038A2 starting from the preceding device describes the viewing in relief of an object photographed at two different angles, the two laser images reproducing these two photos, enabling the observer to see the image of the object in black and white, the object through cylinder lenses giving a three-dimensional appearance.

Patent applications FR 10 01415 carrying the title <<Device for customizing embedded latent images>> filed on Apr. 7, 2010 and patent application FR 11/00578 filed on Feb. 28, 2011 carrying the title <<Method for forming a colour laser image with high reflective yield, and document in which a colour laser image is thus produced>> describe an assembly comprising a matrix of pixels formed of sub-pixels in the primary colours embedded underneath a transparent laserable protective sheet. By means of a laser beam passing through the transparent protective sheet, grey levels are created in the laserable protective sheet covering the RGB sub-pixels with a black non-reflective surface. This treatment, allows the personalisation of a colour laser image of high quality. The primary colours RGB (abbreviation for red green and blue) are obtained by mixing equal portions of the primary colours yellow, magenta and cyan (abbreviated to YMC). Therefore the primary colours RGB in fact comprise the YMC colours from which they derive. These triplets of colours RGB, YMC are said to be independent since the mixing of two colours of one same triplet cannot form the third colour of this same triplet. There therefore exists a large number of triplets of independent colours and hence of primary colours.

In the remainder hereof the term (RGB) sub-pixels shall be given to those sub-pixels whose colours meet the definition of independent colours and correspond to the colours detected by the RGB rod cells (red, green, blue) of the human eye.

Although of advantage in some respects, these structures of colour laser images do not allow viewing in relief.

DISCLOSURE OF THE INVENTION

It is the objective of the present invention to overcome the disadvantages of the prior art by proposing a colour laser image offering three-dimensional viewing.

For this purpose the invention proposes a matrix of pixels comprising sub-pixels in the primary colours which in the remainder hereof shall be termed (RGB) sub-pixels, an array of optical lenses deflecting the laser beam at the time of engraving via carbonization of the laserable protective sheet to form the grey levels of the (RGB) sub-pixels which, depending on the angle of incidence of the laser beam, produce two different colour laser images and by reflection of the ambient light cause these two different colour laser images to be seen separately or simultaneously in this case producing via stereoscopic effect a colour laser image to appear in relief.

More specifically, the subject of the invention is a method for forming two different colour laser images from an assembly comprising a substrate, a laserable protective sheet, an array of cylinder optical lenses, pixels formed of (RGB) sub-pixels printed in primary colours in the form of parallel columns (C1,C2,C3). A laser beam, through the array of optical lenses and via carbonization in the laserable protective sheet opposite each (RGB) sub-pixel, causes the grey levels to appear of two different colour laser images derived from two photos of one same subject taken at different angles. These two colour laser images, by reverse reflection of ambient light through the array of lenses, appear to the observer as a three-dimensional colour laser image of the subject.

The lens array is composed of parallel cylinder lenses and the (RGB) sub-pixels in parallel, columns in the primary colours have their major axis located perpendicular to the major axis of the cylinder lenses of the lens array.

The matrix of (RGB) sub-pixels is printed on the laserable protective sheet by offset, inkjet, thermal transfer or any other technique. According to one variant it can be printed on the substrate.

At a second production step called <<lamination>> the laserable protective sheet is hot welded under pressure onto the substrate of the document trapping the matrix of (RGB) sub-pixels between the laserable protective sheet and the document substrate. Lamination, on the upper surface of the laserable protective sheet, forms the array of lenses. This array partly or wholly covers the matrix of (RGB) sub-pixels.

From two stereoscopic images of one same subject taken from two different angles, the forming of the images subject of the invention appearing to produce an image in relief of the subject, is obtained by means of a laser beam which carbonizes the laserable protective sheet in the thickness thereof, as per variable intensities or surfaces opposite each (RGB) sub-pixel, the laser beam scanning the columns (C1,C2,C3) of sub-pixels parallel to the major axis of these columns and having a certain angle of incidence relative to the plane of the lens array, it is deflected by this array and via carbonization in the laserable protective sheet causes the grey levels of two different images to appear corresponding to the two stereoscopic images of the subject.

The ambient light follows the reverse pathway of the laser beam and is reflected through the array of lenses at different angles, the two colour laser images which via stereoscopic effect are seen by the observer in a direction perpendicular to the plane of the document then appearing as a single image in three dimensions.

The invention also concerns a document comprising a colour laser image which can be seen in three dimensions by implementing the above method. This document comprises a laserable protective sheet on which an array of lenses has been hot printed. This sheet is at least partly carbonized by a laser beam. Printed pixels comprise (RGB) sub-pixels in the form of columns. They are located underneath the array of lenses and have the same surface. The laserable protective sheet on which the array of lenses is positioned, the columns of (RGB) sub-pixels and the document substrate are able to be laminated together.

The axis of the lens array is perpendicular to the axis of the columns of (RGB) sub-pixels. The forming of the colour laser image observable in three dimensions is obtained in the document via a laser beam which scans through the lens array along the axis of the columns of (RBG) sub-pixels at a first angle of incidence relative to the plane of the lens array forming the grey levels in the laserable protective sheet of a first colour laser image taken from a first angle of the subject, and at a second angle of incidence relative to the plane of the lens array forming the grey levels of a second colour laser image taken from a second angle of the subject. The two colour laser images via reverse reflection of ambient light through the array of lenses appear to the observer to be one colour laser image in three dimensions of the subject.

PRESENTATION OF THE FIGURES

The invention will become better after the following description given for explanatory purposes and in no way limiting. This description refers to the appended drawings in which.

Figure 5:
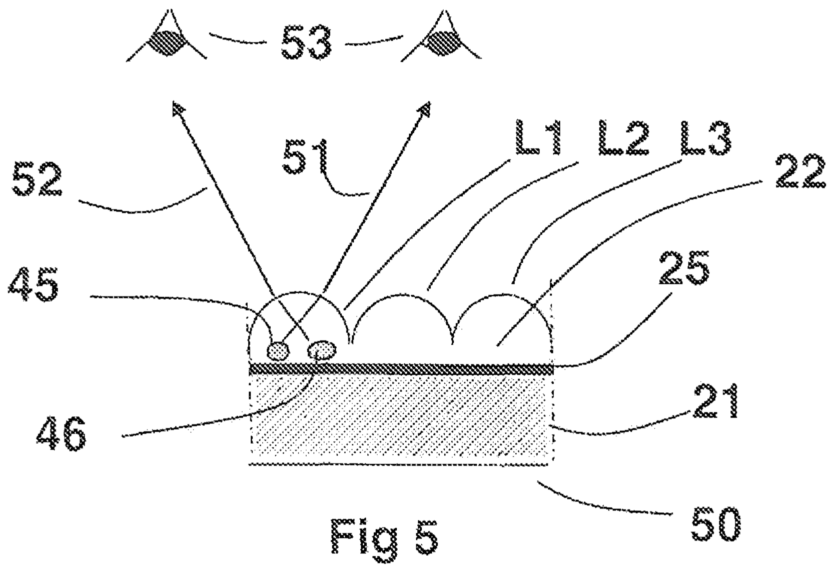

FIG. 5 gives a cross-section of the reflection of ambient light allowing three-dimensional viewing of the colour laser images.

Figure 6:
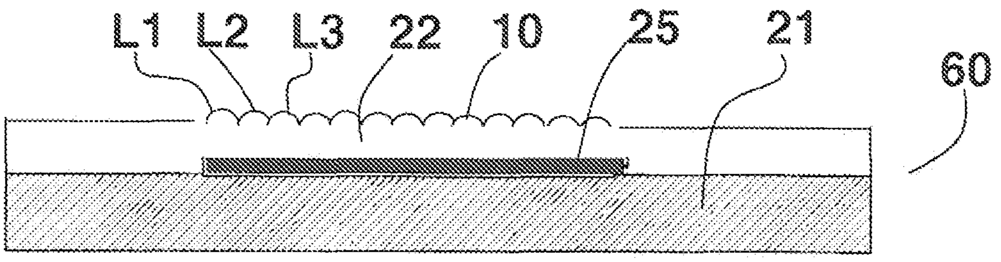

FIG. 6 gives a cross-section of the matrix of (RGB) sub-pixels, the laserable protective layer comprising the array of lenses, the whole being laminated onto the substrate.

Figure 1:
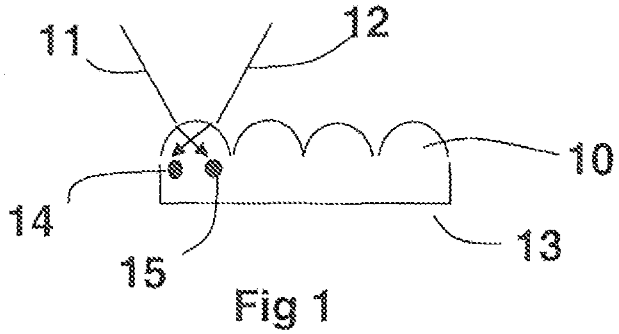
FIG. 1 is a cross-section of a prior art assembly for obtaining a black and white laser image providing three-dimensional viewing.

FIG. 1 shows a cross-section 13 of a lens array 10 according to the prior art. The laser beams 11 and 12, since they have a certain angle of incidence relative to the plane of the lens array, are deflected by the lenses and produce grayscales 14 and 15 forming two different black and white images engraved by laser carbonization.

Figure 2:
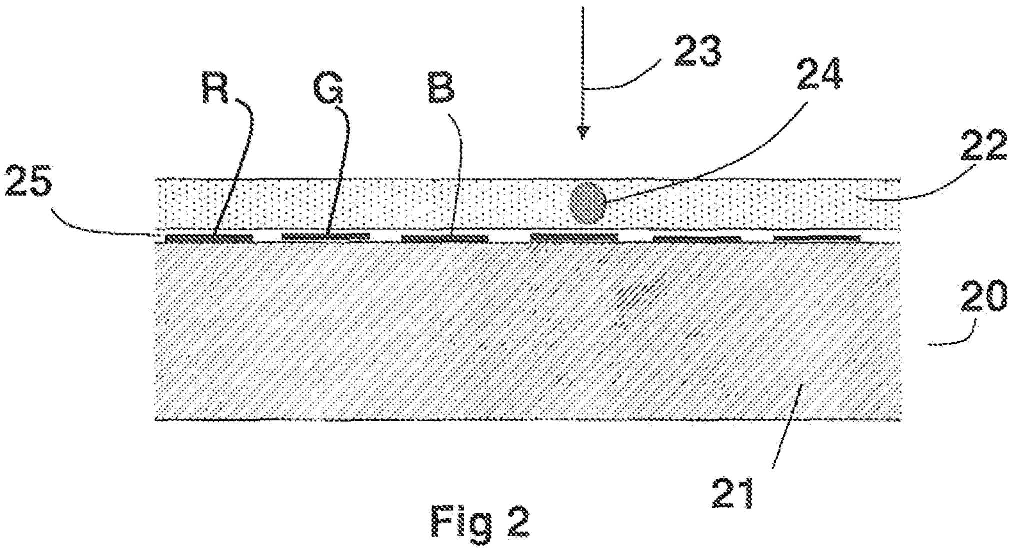
FIG. 2 is a cross-section of a prior art assembly for producing a colour laser image.

FIG. 2 shows a cross-section 20 of an assembly comprising the substrate 21, a matrix 25 of (RGB) sub-pixels, a laser beam 23 which via carbonization in the laserable protective sheet 22 forms non-reflective surfaces 24 forming the grey levels of a colour laser image according to the prior art.

Figure 3:
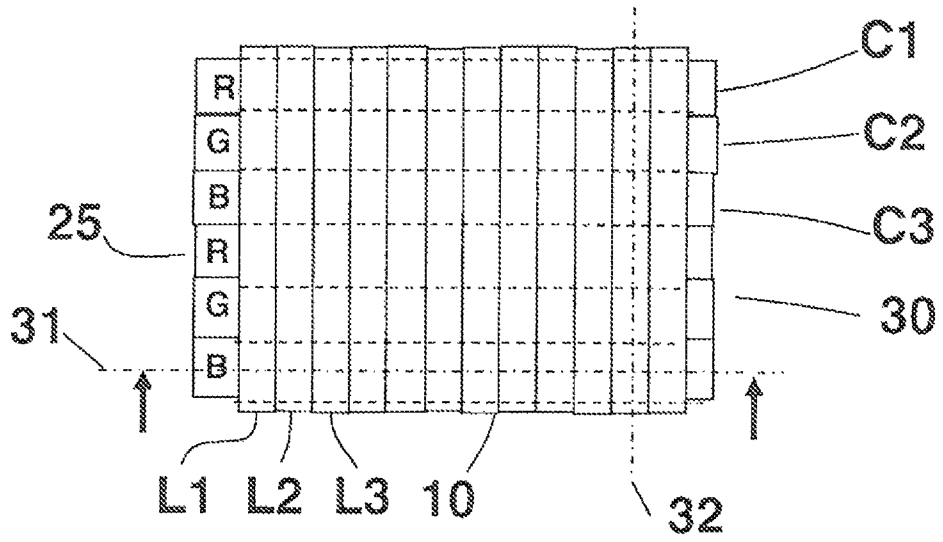
FIG. 3 is a front view of the columns of (RGB) sub-pixels and of the array of optical lenses (L1,L2,L3)

FIG. 3 shows a front view 30 of a matrix of (RGB) sub-pixels 25 in the primary colours. The sub-pixels of this matrix are in the form of parallel columns C1,C2,C3 aligned along their major axis 31. An array 10 of cylinder lenses L1,L2,L3 is aligned along the major axis 32 thereof, and covers the matrix of (RGB) sub-pixels 25. The axes 31 of the columns of sub-pixels and the axes 32 of the cylinder lenses are perpendicular.

Figure 4:
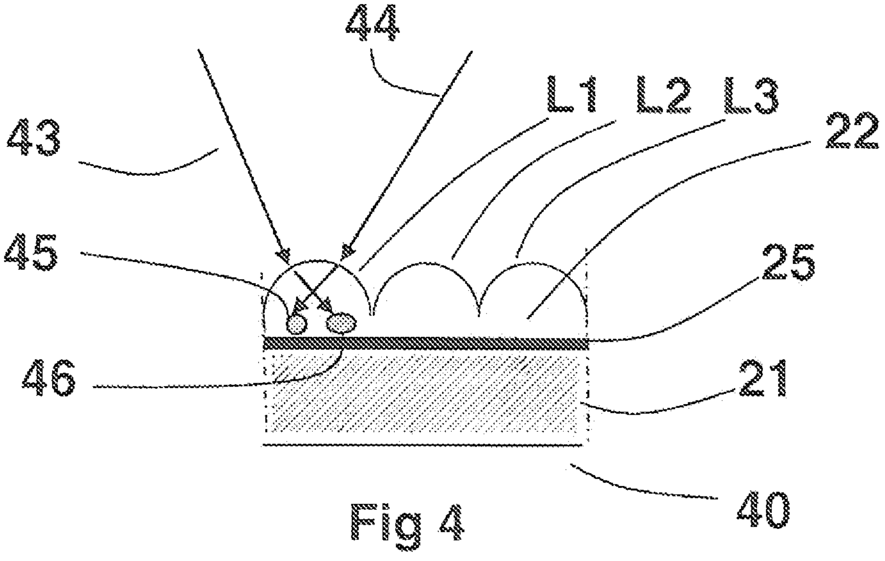
FIG. 4 shows a cross-section of the pathway of the laser beam engraving the grey levels of colour laser images via carbonization.

FIG. 4 gives a cross-section 40 along the axis 31 of the assembly illustrated in FIG. 3. The matrix of (RGB) sub-pixels 25 is illustrated in a cross-section here. The cylinder lenses L1,L2,L3 illustrated in a cross-section perpendicular to their major axis 32 in FIG. 3, are formed on the laserable protective sheet 22.

As non-limiting examples the laserable materials may be polycarbonates, some treated polyvinyl chlorides, treated acrylonitrile-butadiene-styrenes or treated polyethylene terephthalates. The laserable material is partly carbonized by the laser to form grey levels of a personalised image. The laserable protective sheet is transparent and has a thickness of between 20 μm and 500 μm.

Laser scanning is performed along the axis 31 at a first angle of incidence 43 relative to the plane of the lens array, forming the grey levels 46 of a first colour laser image taken from a first angle of the subject, and at a second angle of incidence 44 relative to the plane of the lens array forming the grey levels 45 of a second colour laser image taken from a second angle of the subject.

FIG. 5 is a cross-section 50 of the reverse pathway of ambient light which, through the array of lenses L1,L2,L3 printed on the laserable protective layer 22, is reflected on the matrix of (RGB) sub-pixels 25 causing the grey levels 45 to appear of the first colour image, and 46 of the second colour image, as seen 53 by an observer positioned perpendicular to the plane of the lenses L1,L2,L3, the reflected rays 52 and 51 producing a stereoscopic colour laser view in three dimensions of the subject.

FIG. 6 shows a cross-section 60 of an assembly comprising the substrate 21 on which the laserable protective sheet 22 is laminated, the matrix of (RGB) sub-pixels 25 and lying opposite this matrix of sub-pixels the array 10 of lenses L1, L2, L3. This lens array is formed by hot pressing onto the sheet 22 at the time of laminating the laserable protective sheet 22 onto the substrate 21, trapping the columns of (RGB) sub-pixels 25 between the laserable protective sheet 22 and the substrate 21.

The invention claimed is:

1. A method comprising:

forming two different colour laser images from an assembly comprising:

a substrate, a laserable protective sheet, an array of cylindrical optical lenses, and pixels formed by RGB sub-pixels printed in primary colours in the form of parallel columns, wherein the forming comprises causing grey levels of the two different colour laser images to appear by providing a laser beam through the array of cylindrical optical lenses, the laser beam carbonizing the laserable protective sheet opposite each of the RGB sub-pixels; and wherein the two different colour laser images, via reverse reflection of ambient light through the array of cylindrical optical lenses, appear to an observer of the assembly to be a three-dimensional colour laser image.

2. The method according to claim 1, wherein:

an axis of the parallel columns forming the RGB sub-pixels is perpendicular to an axis of the array of cylindrical optical lenses, and the array partially or fully covers the RGB sub-pixels.

3. The method according to claim 1, wherein the forming by providing the laser beam comprises:

forming the grey levels of a first colour laser image taken from a first angle of a subject by scanning the parallel columns along an axis at a first angle of incidence relative to a plane of the array of lenses; and forming the grey levels of a second colour laser image taken from a second angle of the subject by scanning the parallel columns along the axis at a second angle of incidence relative to the plane of the array of cylindrical optical lenses.

4. A document comprising two colour laser images produced by implementing the method according to claim 1, wherein:

the laserable protective sheet on which the array of cylindrical optical lenses has been hot printed, the laserable protective sheet is at least partially carbonized by the laser beam; and the pixels are printed between the array of cylindrical optical lenses and the substrate;

the pixels cover a same surface as the array of cylindrical optical lenses; and the pixels comprise the RGB sub-pixels organised in the form of the parallel columns; and the laserable protective sheet, the parallel columns of RGB sub-pixels and the document substrate are laminated together.

5. The document according to claim 4, wherein:

an axis of the parallel columns of the RGB sub-pixels is perpendicular to an axis of the array of cylindrical optical lenses; and the array of cylindrical optical lenses partially or fully covers the RGB sub-pixels.

6. The document according to claim 4, wherein the laserable protective sheet includes the two different colour laser images that, via reverse reflection of the ambient light through the array of cylindrical optical lenses, comprise the three-dimensional colour laser image.

* * * * *